United States Patent [19]

Claussen

[11] 4,307,862
[45] Dec. 29, 1981

[54] FLASHLIGHT HOLDER

[76] Inventor: Robert C. Claussen, 1313 - 27th Ave., Moline, Ill. 61265

[21] Appl. No.: 183,605

[22] Filed: Sep. 2, 1980

[51] Int. Cl.³ .............................................. F16L 3/00
[52] U.S. Cl. .................................... 248/121; 248/435
[58] Field of Search .................... 248/168, 188.7, 167, 248/434, 435, 165, 164, 170, 171, 121, 125, 166; 362/413; 211/205, 203

[56] References Cited

U.S. PATENT DOCUMENTS

| | | | |
|---|---|---|---|
| 199,576 | 1/1878 | Rodig | 248/84 |
| 389,346 | 9/1888 | Utzinger | 248/230 UX |
| 576,815 | 2/1897 | Grant | 248/167 X |
| 1,199,059 | 9/1916 | Doty | 248/168 X |
| 1,344,073 | 6/1920 | Williams . | |
| 1,357,250 | 11/1920 | Rau | 248/167 |
| 1,367,369 | 2/1921 | Friend . | |
| 1,481,998 | 1/1924 | Eldredge | 248/170 |
| 1,545,279 | 7/1925 | Ross | 248/168 X |
| 1,748,885 | 2/1930 | Lally . | |
| 2,220,220 | 11/1940 | Cusimano | 362/413 X |
| 2,464,031 | 3/1949 | Fiedel | 248/165 X |
| 2,495,995 | 1/1950 | Warrens et al. | 248/82 |
| 2,522,345 | 9/1950 | Cashiopp | 248/121 |
| 2,706,610 | 4/1955 | Roberts | 248/168 |
| 3,173,642 | 3/1965 | Greenspan | 248/170 |
| 3,415,476 | 12/1968 | McDermott . | |
| 4,141,524 | 2/1979 | Corvese | 248/226.1 X |

Primary Examiner—J. Franklin Foss
Attorney, Agent, or Firm—Henderson & Sturm

[57] ABSTRACT

The holder invention relates to devices employed for holding flashlights. Stable mounting of a flashlight and accurate directional control of the light beam in the wide variety of work situations is achieved by a clamp assembly (14) jointed to a base assembly (12) by a standard (13). Adjustable legs (22) with grasping foot plates (30, 30') are joined to the base.

1 Claim, 9 Drawing Figures

FLASHLIGHT HOLDER

TECHNICAL FIELD

This invention relates generally to support structures. More particularly the invention relates to support structures for flashlights.

BACKGROUND ART

Various devices have been developed for supporting pipes, hoses, lights and also flashlights. Some of these devices are shown in U.S. Pat. Nos. 199,576 (Rodig); 1,344,073 (Williams); 1,367,369 (Friend); 1,748,885 (Lally); 2,495,995 (Warrens et al.); 2,706,610 (Roberts); 3,415,476 (McDermott); and the article at page 123 of the September 1949 issue of Popular Mechanics.

The aforementioned patents dealing with pipes and hoses show supports with rigid bases, rigid standards, some telescoping, attached to the bases, and complex ball and socket structures, attached to the standard for bearing the hose or the like. U.S. Pat. No. 3,415,476 shows a massive standard bearing a fixed light and being attached to a base with rigid legs. Those aforementioned patents concerned with flashlights show rigid tripod, U-shaped, or formed wire legs attached to the structure which grasps the flashlight.

The supports engage the ground and hold a hose, pipe or light at a distance above the ground. The supports having formed wire bases may be hung from a nail or the like projecting from a wall. Generally, however, the number of positions in which a light may be supported are limited. Furthermore, the places in which a light may be supported are limited. There exists a need for a support much more useful and conveniently operable, particularly in shop situations.

DISCLOSURE OF INVENTION

The flashlight holder of this invention includes a clamp assembly pivotally attached to a standard or shaft. The standard is telescoping and is pivotally attached to a base. A plurality of legs are pivotally attached to the base, each leg having a plurality of elements pivotally attached to each other. Hook elements are attached at the extended ends of the legs.

It is an object of this invention to provide an improved flashlight holder.

More particularly, it is an object of this invention to provide a holder capable of supporting a flashlight in a substantially greater number of orientations.

Another object of the invention is provision of a holder which may position a flashlight a substantial distance to one side, away from directly over, the holder.

Also an object of the invention is provision of a flashlight holder readily collapsible into a convenient storage configuration.

A further object of this invention is to provide a flashlight holder having a readily controllable effective base area.

An additional object is provision of a flashlight holder having superior adaptability to use with stepladders, perforated surfaces, and a wide variety of surfaces in general.

Also an object is provision of a flashlight holder rugged in construction but capable of achieving the aforementioned objects, thereby providing a holder having superior utility in shop situations.

These objects and other features and advantages of this flashlight holder invention will become readily apparent upon referring to the following description in conjunction with the appended drawing figures.

BRIEF DESCRIPTION OF DRAWINGS

The flashlight holder invention is illustrated in the drawings wherein.

BEST MODE FOR CARRYING OUT THE INVENTION

Figure 1:
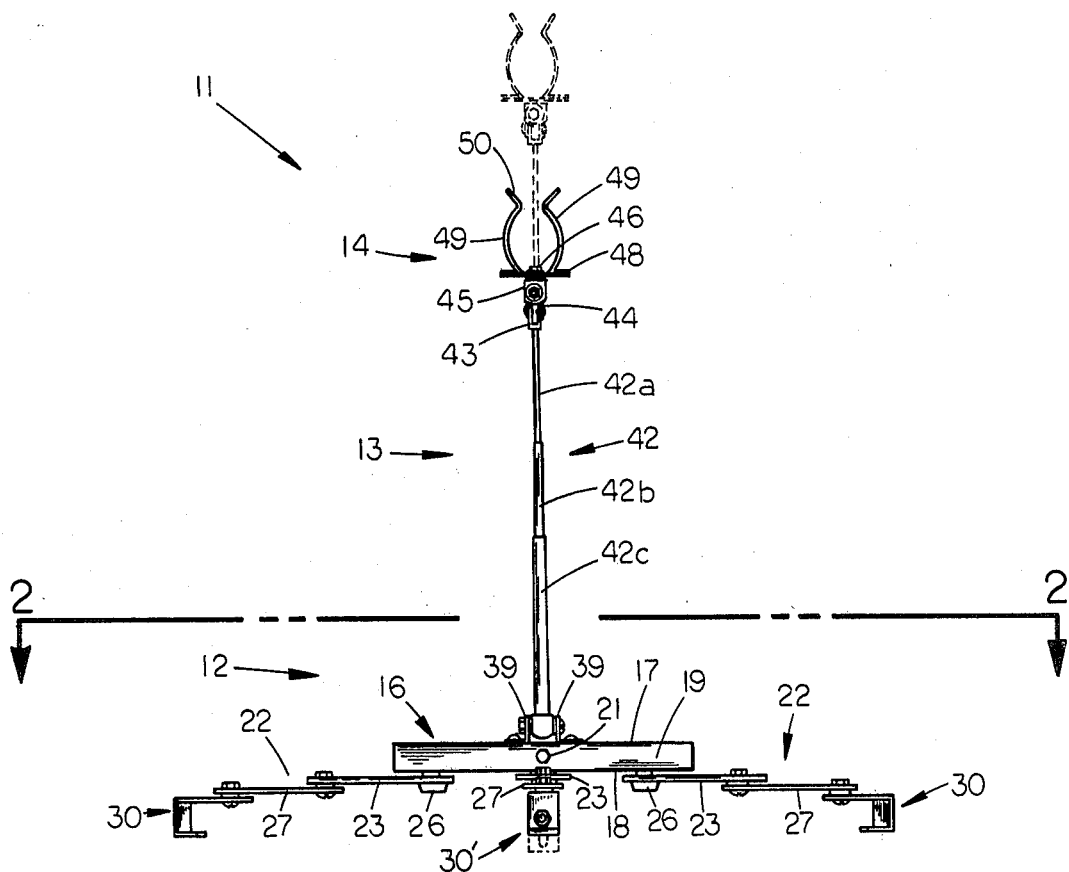
FIG. 1 is a front elevational view of the flashlight holder.

The flashlight holder invention is shown generally at 11 in FIG. 1. More particularly, the holder 11 includes a base assembly 12, a standard assembly 13 and a clamp assembly 14.

The base assembly 12 includes (FIGS. 1-3) a disk-shaped base 16 having a cover 16a which fits over a bottom member 16b. The members 16a, 16b have generally circular top and bottom surfaces 17, 18 respectively. A peripheral surface 19 extends between surfaces 17, 18. Three positioning bolts or screws 21 are fixed to the peripheral surface 19, are radially spaced (as viewed in plan) about 120° apart and connect members 16a, 16b.

Figure 3:
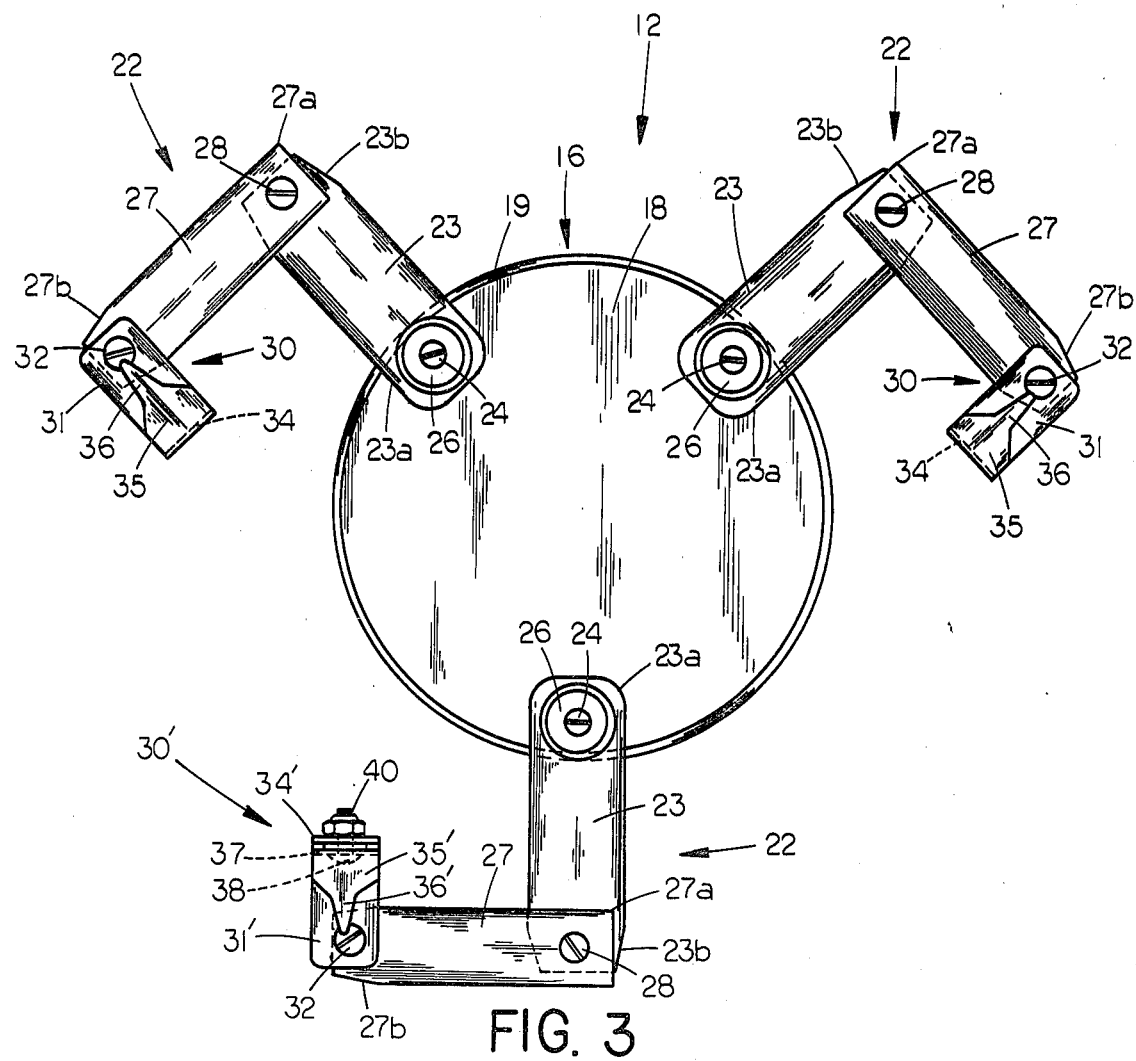
FIG. 3 is an enlarged, bottom plan view of the flashlight holder showing articulation of the legs thereof.
Figure 4:
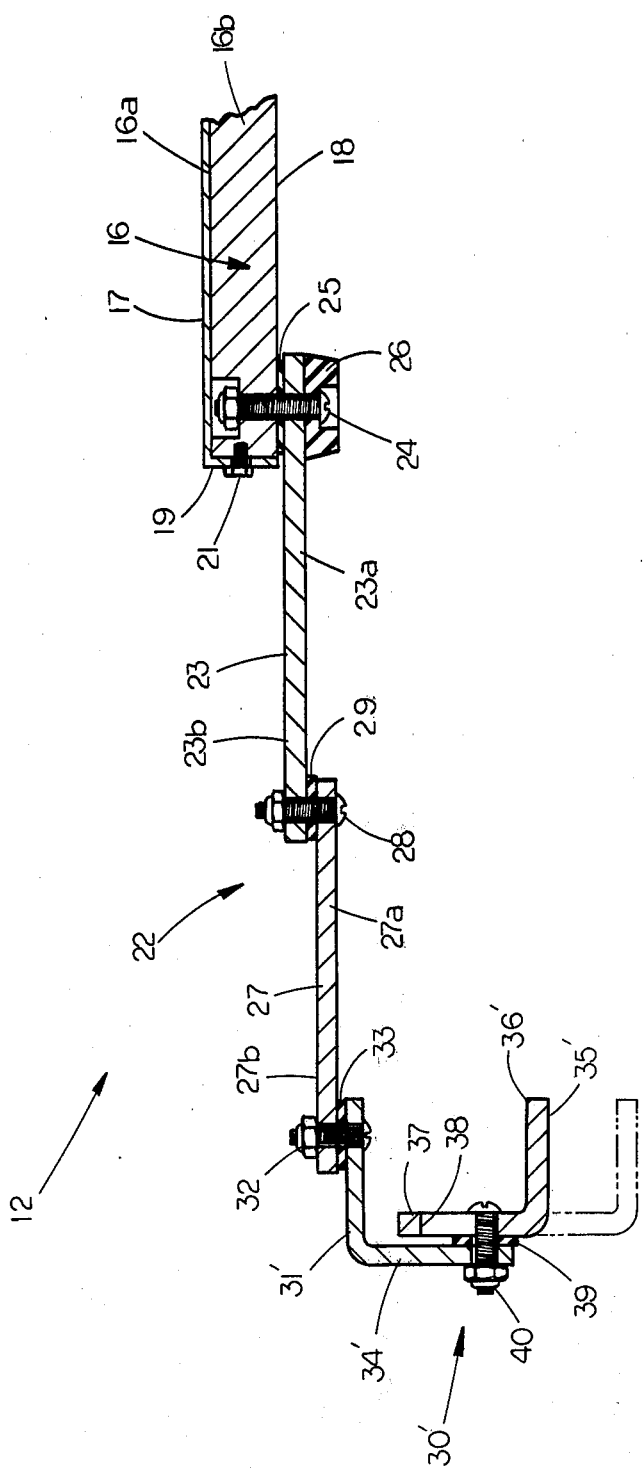
FIG. 4 is an enlarged, fragmentary, vertical longitudinal sectional view of the front leg of the flashlight holder.

Three legs 22 are attached to the base 16 (FIGS. 3 and 4). Each leg 22 includes an elongated first, or inner plate 23 with an inside end 23a and a tapered end 23b. A bolt 24 pivotally joins the inside end 23a to the bottom surface 18 of base 16, the bolt 24 projecting into a countersink formed in member 16b and being held by a locking nut. A rubber washer 25 separates the plate 23 from surface 18. The bolt 24 holds a resilient footpad 26 to the plate 23 opposite washer 25 and is countersunk into the footpad 26.

Each leg 22 has a second, or middle plate 27, also having an inside end 27a and a tapered end 27b. The inside end 27a is pivotally attached to tapered end 23b by a nut and bolt 28, the ends 23b, 27a being separated by a rubber washer 29.

Further, all but one leg 22 has a third, or extended foot plate 30 generally C-shaped in configuration. The foot plate 30 has a first part 31 pivotally attached by nut and bolt 32 to tapered end 27b, the members 27b, 31 being separated by a rubber washer 33. The second part 34 joins first part 31 to third part 35 and is normal to both parts 31, 35. The third part 35 tapers to form a finger 36.

One leg 22 has an adjustable foot plate 30'. One generally L-shaped member includes a first part 31' pivotally attached to tapered end 27b; and a second part 34' is joined normal to part 31'. A second generally L-shaped member includes a part 35', which tapers to form a finger 36', and a part 37 joined normal to part 35'. A longitudinal slot 38 is formed in part 37. The parts 34', 37 are separated by a rubber washer 39 and are connected by nut and bolt 40 passing through slot 38.

The plates 23 are attached to base 16 adjacent the screws 21, and the plates 23, 27, 31, 31' are connected, such that, when viewed in plan (FIG. 2), the longitudinal axes of the plates 23, 27, 31, 31' of each leg 22 may be aligned and also aligned with the radius of the base 16 passing through the adjacent screw 21. The plates 23, 27, 31, 31', 35, 35' define planes which are parallel to those of surfaces 17, 18 and are pivoted about axes normal to these planes. Three legs 22 are shown herein, but more may be employed.

The standard assembly 13 (FIGS. 1 and 2) includes a pair of L-shaped mounting brackets 39, attached to, adjacent the center of, the top surface 17. A shaft 42 includes three sections 42a, 42b, 42c connected in telescoping fashion. The bottom section 42c is pivotally mounted by the brackets 39 and is pivotable about an axis parallel to surface 17. Fixed at the extended end of top section 42a is a bracket 43.

Figure 5:
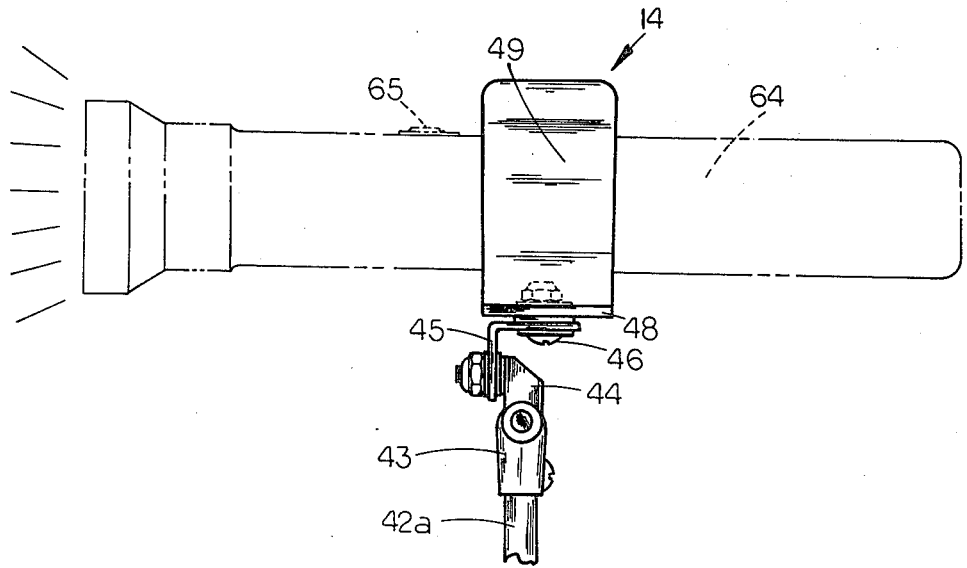
FIG. 5 is an enlarged, fragmentary side elevational view showing the clamp assembly of the flashlight holder.

A first pivot member 44 (FIG. 5) is mounted on bracket 43 and is pivotable thereon about an axis parallel to the pivot axis of section 42c. A second pivot member 45 is mounted on member 44 and pivotable thereon about an axis normal to the pivot axis of member 44. The second pivot member 45 is generally L-shaped and provides a pivot attachment at 46 for the clamping assembly 14, the pivot axis through 46 being normal to the pivot axes of members 44, 45 and being alignable with the longitudinal axis of shaft 42.

The clamp assembly 14 (FIGS. 1 and 5) includes a unitary spring clamp 47. A base 48 is attached at 46, and arms 49 extend from each end of base 48 and curve toward each other to form a restricted access slot 50.

Figure 6:
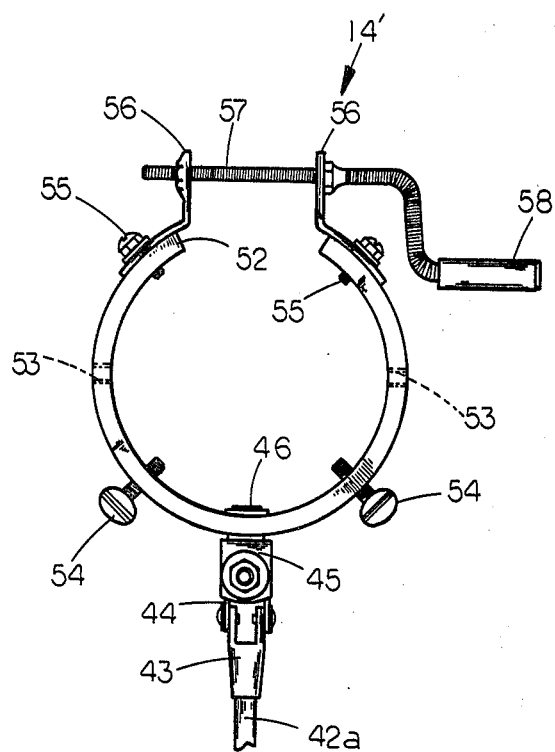
FIG. 6 is an enlarged, fragmentary front elevational view of an alternate clamp assembly.
Figure 7:
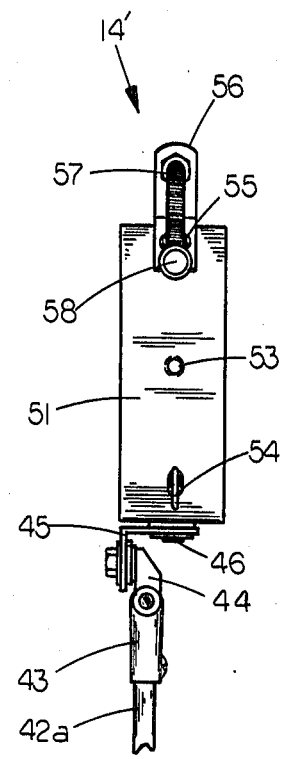
FIG. 7 is an enlarged, fragmentary side elevational view of the FIG. 6 clamp assembly.

The clamp assembly may have an alternate construction 14' (FIGS. 6 and 7). A sleeve 51 is generally C-shaped in end view (FIG. 6) and has a longitudinal slot 52. The sleeve 51 is attached at 46 directly opposite the slot 52. Bores 53 circumferentially spaced are formed through the sleeve 51 into which are threaded tightening screws 54 or mounting screws 55. Support brackets 56 are fixed by screws 55 to the sleeve 51 on both sides of slot 52. A main tightening screw 57, with hand-engageable crank portion 58, is threaded through the brackets 56 and spans slot 52.

Figure 8:
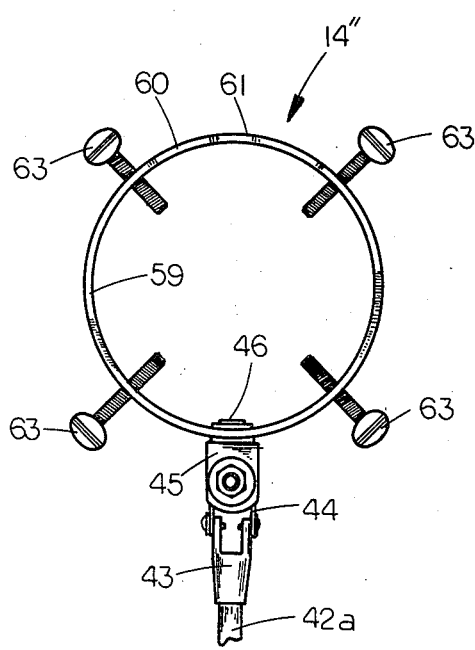
FIG. 8 is an enlarged, fragmentary front elevational view of a second alternate clamp assembly.
Figure 9:
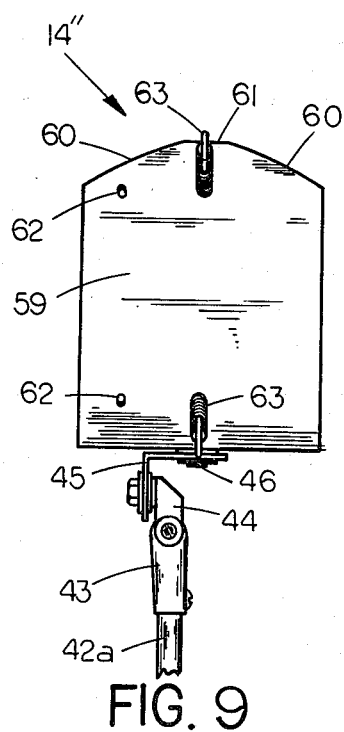
FIG. 9 is an enlarged, fragmentary side elevational view of the FIG. 8 clamp assembly.

Another alternate configuration of the clamp assembly is shown at 14" (FIGS. 8 and 9). A sleeve 59 is generally circular in end view (FIG. 8). Cut-out areas 60 extend toward each other from opposite ends of the sleeve 59 to form a sleeve wall area 61 of relatively short length. The sleeve 59 is attached at 46 directly opposite wall area 61. Bores 62 circumferentially spaced are formed through sleeve 59 into which tightening screws 64 are threaded. The bores 62 may be longitudinally spaced (FIG. 9) also.

The flashlight holder 11 generally may be formed from plastic, aluminum or lightweight steel by well known methods. The clamp 47 is of spring steel. Rubber washers are preferred, but spring washers are usable.

When the holder 11 is used, a flashlight 64 is pressed through slot 50 of clamp 47 or slipped endwise into sleeves 51, 59. Assembly 14' is tightened onto the flashlight by rotating main screw 57 such that slot 52 is narrowed and by threading screws 54 into sleeve 51 against the flashlight. Assembly 14" is tightened by threading screws 63 against the flashlight. Additional fixing of the flashlight orientation is achieved by threading tightening screws into longitudinally spaced bores. The slots 50, 52 and areas 60 additionally facilitate access to the flashlight on-off switch 65. The flashlight is removed by reversing the aforementioned procedure.

Orientation of the flashlight is adjusted by extending or contracting the shaft 42 (see FIG. 1, dotted lines). Pivoting of shaft 42 in its brackets 39, pivoting of members 44, 45 and pivoting of clamping assembly 14, 14', 14" about 46, provide adjustment about three axes such that the flashlight can be pointed in any direction.

Figure 2:
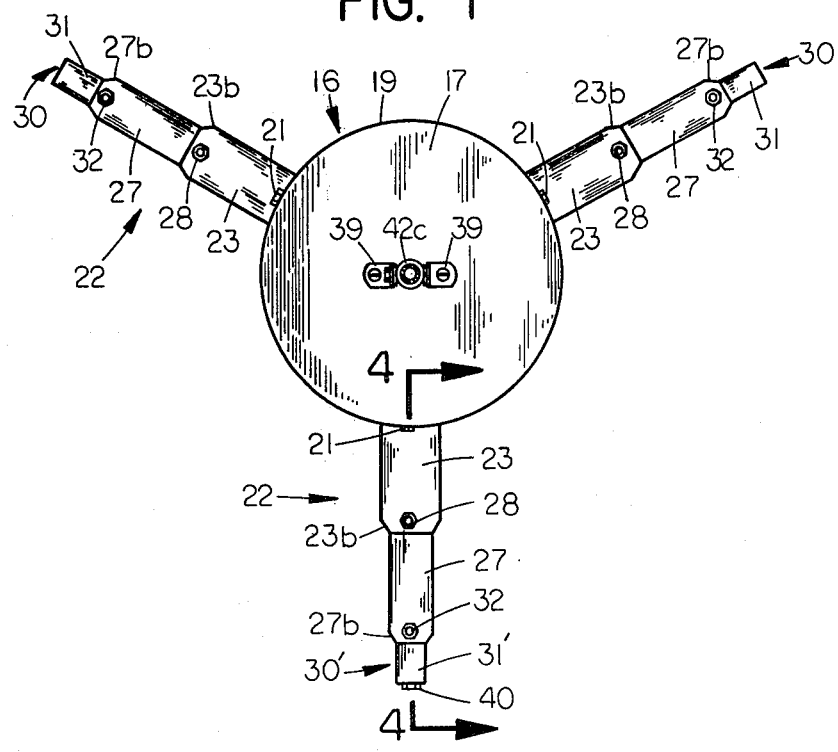
FIG. 2 is a part sectional, top plan view of the flashlight holder taken along line 2—2 in FIG. 1.

The effective support area of the base assembly 12 is varied by operation of the legs 22. A maximum area is illustrated in FIG. 2 where the legs 22 have been straightened and aligned with the radii passing through the positioning screws 21. Adjustment of the legs 22 to cover an intermediate area is shown in FIG. 3. A minimum area is provided, as for storage purposes, by disposing the plates 23, 27 and 30 or 30' of each leg 22 directly beneath each other and then rotating the legs 22 to substantially beneath base 16 adjacent surface 18. Greater effective support areas are employed as the shaft 42 is extended and as the shaft 42 is pivoted at 39 toward surface 17 and away from an orientation generally normal to base 16.

The foot plates 30, 30' may support the holder 11 on a ground or floor surface, foot plate portions 35, 35' engaging the ground. The foot plates 30, 30' also grasp wires, boards, plates, rods and the like within the area between portions 31, 34, 35 or 31', 34', 35', 37. Furthermore the fingers 36 can engage perforated surfaces. Support as by hanging the holder 11 and support on uneven or steeply inclined surfaces are provided. As shown in FIG. 4, dotted lines, the foot pad 30' may be adjusted to facilitate grasping of a rod, board, plate or the like or a perforated surface, or to facilitate orientation of the flashlight when the holder 11 is resting upon foot plate portions 35, 35'.

The holder 11 is particularly suitable for use with stepladders and the like. The aforementioned operation of the legs 22 and foot plates 30, 30' enables the holder 11 to grasp the side members of the front and back portions of the ladder, thereby supporting a flashlight close to the ladder but to one side away from the steps of the ladder. Also, in conjunction with the foot pads 26, the operation of the legs 22 and grasping by the foot plates 30, 30' enable the holder 11 to be firmly positioned on the stepladder paint tray or the top step of the ladder.

INDUSTRIAL APPLICABILITY

Features and advantages of this invention are believed to be apparent from the foregoing description. The flashlight holder 11 has superior utility in work situations, providing stable mounting of flashlights and accurate directional control of the light beam in the widely variable situations in which flashlights typically are used. Although a preferred mode and modifications thereof have been disclosed herein, various alternate constructions can be made without departing from the full scope of the invention defined in the appended claims.

I claim:

1. A flashlight holder having a base, a standard mounted on and rising from the base and clamp means on the standard for holding a flashlight, the improvement comprising a plurality of leg means for supporting the base, each leg means including an inner plate means having an inner end adjustably pivoted to the base on an upright axis and extending to an outer end spaced radially from the base, an intermediate plate means having an inner end adjustably pivoted to the outer end of the inner plate means on an upright axis and extending to an outer end spaced radially from the base, and grasping means adjustably pivoted on an upright axis to the outer end of the intermediate plate means and having a terminal end in the form of a hook including a first portion depending below the plane of the intermediate plate means and a finger affixed to said portion and directed back toward the base means and spaced below the plane of the intermediate plate means, the finger of at least one grasping means being selectively vertically adjustable relative to its depending first portion.

* * * * *